United States Patent
Van Kesteren

[11] Patent Number: 5,890,278
[45] Date of Patent: Apr. 6, 1999

[54] METHOD OF MANUFACTURING A MAGNETIC HEAD HAVING A STRUCTURE OF LAYERS

[75] Inventor: Hans W. Van Kesteren, Eindhoven, Netherlands

[73] Assignee: U.S. Philips Corporation, New York, N.Y.

[21] Appl. No.: 961,416

[22] Filed: Oct. 30, 1997

[30] Foreign Application Priority Data

Apr. 1, 1997 [EP] European Pat. Off. ............. 97200943

[51] Int. Cl.⁶ .................................................. G11B 5/127
[52] U.S. Cl. ..................................... 29/603.14; 29/603.15
[58] Field of Search ........................... 29/603.07, 603.13, 29/603.14, 603.15; 360/122, 126, 127

[56] References Cited

U.S. PATENT DOCUMENTS 5,375,023  12/1994  Ju et al. .................................. 360/119

FOREIGN PATENT DOCUMENTS

0617409A1  9/1994  European Pat. Off. .......... G11B 5/39
0617410A2  9/1994  European Pat. Off. .......... G11B 5/39

*Primary Examiner*—Carl E. Hall
*Assistant Examiner*—Davide Caputo
*Attorney, Agent, or Firm*—David R. Treacy

[57] ABSTRACT

Method of manufacturing a multilayer thin film magnetic head having reproducibly narrow gap widths, by:
- providing a stepped non-magnetic basic layer;
- providing a stepped magnetically permeable layer on the stepped basic layer;
- providing a stepped non-magnetic layer on the magnetically permeable layer;
- planarizing the structure to a level to expose the stepped part of the first magnetically permeable layer in the planarized surface, so that the thickness of the first magnetically permeable layer determines the width of the transducing gap of the magnetic head which is being formed.

8 Claims, 4 Drawing Sheets

METHOD OF MANUFACTURING A MAGNETIC HEAD HAVING A STRUCTURE OF LAYERS

BACKGROUND OF THE INVENTION

The invention relates to a method of manufacturing a magnetic head having a head face which extends in a first direction in which the magnetic head and a recording medium are relatively movable with respect to each other, and in a second direction transverse to the first direction, and comprising a first flux guide, a second flux guide and a transducing gap bounded by the two flux guides, in which method the magnetic head is built up in layers, in which consecutively a first magnetically permeable layer for forming the first flux guide, a non-magnetic gap layer for forming the transducing gap and a second magnetically permeable layer for forming the second flux guide are provided.

Such a method is known from U.S. Pat. No. 5,375,023. The known method is intended for manufacturing thin-film magnetic heads which are suitable for scanning track widths in the sub-micron area. These magnetic heads have the specific feature that they have stepped pole-top configurations. The known method comprises the deposition of a seed layer on which an insulation layer of a non-magnetic material is deposited, which insulation layer is etched via a mask until the seed layer is exposed, whereafter a ferromagnetic bottom layer, which is thinner than the insulation layer, is electrodeposited on the seed layer between the remaining parts of the insulation layer. Subsequently, a gap layer is deposited on the entire surface, whereafter a ferromagnetic top layer is electrodeposited, whereafter both ferromagnetic layers overlap each other.

A part of said bottom layer is removed by means of etching, with the top layer functioning as a mask, so that a stepped lower pole top is obtained. Due to a difference in height between the insulation layer and the bottom layer, the top layer constitutes a stepped upper pole top. The stepped pole tops obtained determine the gap width of the magnetic head. However, a gap which is not completely planar and has an inaccurately defined gap width is obtained with conventional deposition techniques. The gap width accuracy is also determined by the accuracy with which etching is performed or can be performed. In practice, however, a high etching accuracy is difficult to realize.

OBJECTS AND SUMMARY OF THE INVENTION

It is an object of the invention to provide a method with which magnetic heads having small, predefined gap widths can be manufactured in a relatively simple, but reproducible way.

To this end, the method according to the invention is characterized by the steps of:
providing a non-magnetic basic layer,
structuring the basic layer by removing non-magnetic material, resulting in a hollow part in the basic layer, which hollow part has a depth dimension extending in the first direction at the head face to be formed, and a wall portion intersecting the head face to be formed,
providing the first magnetically permeable layer on the basic layer thus structured, having a thickness at the head face to be formed, which is smaller than the depth dimension of the hollow part,
providing a non-magnetic intermediate layer on the first magnetically permeable layer,
forming a plane surface by removing material, said surface comprising, at the head face to be formed, a part of the basic layer, a part of the first magnetically permeable layer and a part of the intermediate layer,
providing the non-magnetic gap layer on said surface,
providing the second magnetically permeable layer on said gap layer, and
forming the head face.

The transducing gap in the magnetic head according to the invention has a gap width which is determined by the thickness of the part of the first magnetically permeable layer forming part of the plane surface, at the area of the head face. The first magnetically permeable layer may be formed by means of known deposition techniques, such as sputtering or electrodeposition. Since deposition processes can be eminently controlled, the desired thickness of said first layer, particularly the thickness at the area of said surface, can be obtained with great accuracy. This results in magnetic heads having transducing gaps with accurate gap widths.

One or more transducing elements are formed when the method according to the invention is being carried out. The magnetic heads obtainable by means of the method according to the invention may be magnetoresistive heads or magnetic heads having one or more inductive transducing elements in the form of one or more windings. The magnetic heads having one or more transducing gaps, particularly narrow transducing gaps, may be used wherever information tracks having narrow or very narrow track widths, for example between 0.1 and 5 $\mu$m, must be read and/or written. Examples are helical-scan recording, linear tape recording and disc recording.

It is to be noted that a method of manufacturing a combination magnetic head having a write portion and a read portion is known from EP-A 0 670 570, in which a hollow part is formed in a non-magnetic layer of the write portion during manufacture, in which hollow part write windings are embedded in a polymer after a bottom pole has been provided. In this known method, the formation of the hollow part is only intended for countersinking the write windings so that a smooth polymer surface is possible as a base for a write gap layer.

An embodiment of the method according to the invention is characterized in that non-magnetic material for forming the hollow part is removed by means of etching. Etching may be, for example chemical etching, ion beam milling, sputter etching or a combination of etching processes. The etching process is not critical because it is not the hollow part which determines the gap width but the first magnetically permeable layer provided after etching. Etching may take place throughout the depth of the basic layer, but generally, etching is not performed throughout the layer. After partial etching, the entire first magnetically permeable layer can be provided on one and the same bottom layer, which is favorable with regard to the adhesion of said first layer.

The measure defined in claim 3 has the advantage that sharp transitions in the first flux guide to be formed are prevented, so that large local mechanical tension variations in the first magnetically permeable layer are inhibited. Mechanical tensions could lead to loss of efficiency due to, for example, cracks in the layer.

A uniform layer thickness of said magnetically permeable layer is obtained by using the measure defined in claim 4.

An embodiment of the method according to the invention is characterized in that use is made of mechano-chemical polishing when forming the plane surface. This known polishing method is described in, for example, EP-A 0 617 409 or EP-A 0 617 410 (PHN 14.428 and PHN 14.429, respectively; both herein incorporated by reference).

An embodiment of the method according to the invention, which can be realized in a technologically simple manner, is characterized in that a transducing element is formed after providing the gap layer but before providing the second magnetically permeable layer. It is alternatively possible to form a transducing element after providing the first magnetically permeable layer but before providing the gap layer. If a very small gap length is desired, it is favorable to provide an insulation layer after the transducing element has been formed, while a part of this insulation layer is subsequently removed at the area of the transducing gap to be formed, whereafter the second flux guide is formed.

The invention also relates to a magnetic head having a transducing element and obtainable by means of the method according to the invention.

The measure defined in claim 10 has the advantage that effects such as side-writing effects, side-erasing effects or side-reading effects are small in proportion to the gap width.

These and other aspects of the invention are apparent from and will be elucidated with reference to the embodiments described hereinafter.

Figure 1:
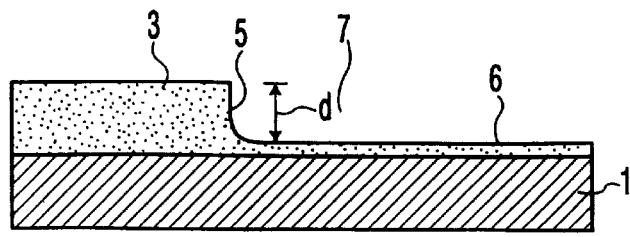
FIG. 1 is a diagrammatic cross-section of a phase of an embodiment of the method according to the invention.
Figure 2:
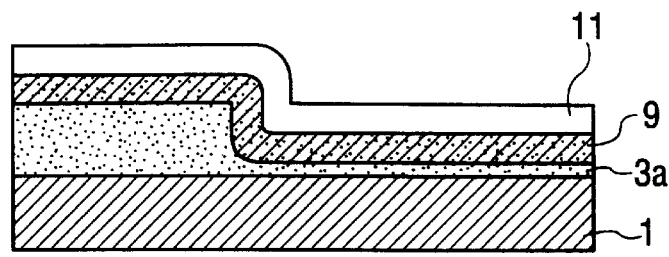
FIGS. 2, 3 and 4 are diagrammatic cross-sections of further phases of said embodiment of the method.
Figure 3:
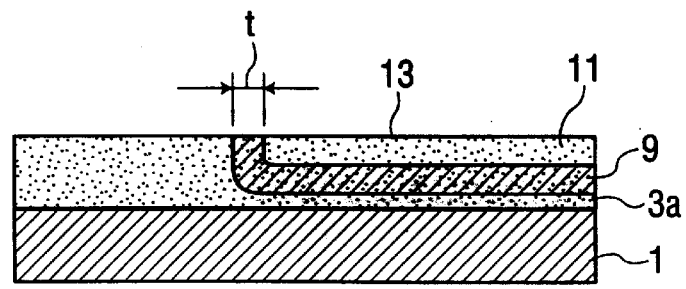
Figure 4:
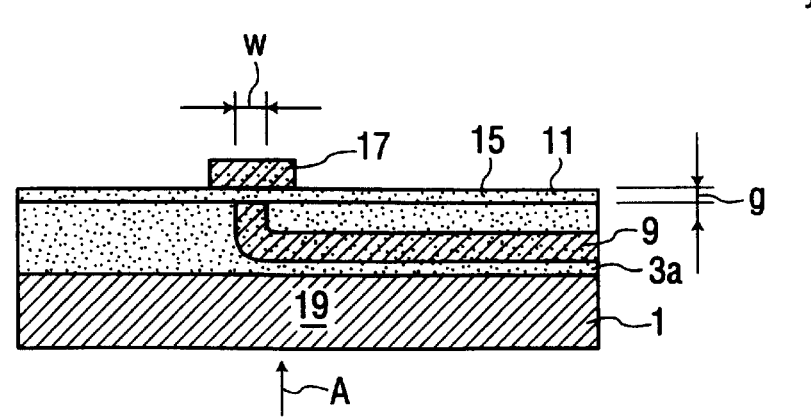

The method according to the invention, shown in FIGS. 1 to 4, starts from a non-magnetic substrate 1, such as $Al_2O_3/TiC$, on which a non-magnetic basic layer 3 is formed by deposition, such as sputtering, of a non-magnetic material such as $SiO_2$ or $Al_2O_3$. By removing material, for example by means of etching, a hollow part 7 having a wall portion 5 is formed in the basic layer 3. The wall portion 5 merges with a bottom portion 6. By means of deposition, such as sputtering, of a magnetically permeable material, such as amorphous alloys, for example CoZrNb, or nanocrystalline iron alloys such as FeTa-N, a first magnetically permeable layer 9 is formed on the hollowed basic layer 3a thus obtained. Deposition by means of sputtering may take place at a sputter angle of between 20° and 70°, measured from the wall portion 5. An NiFe alloy may be alternatively used as a magnetically permeable material. This material may also be electrodeposited if a seed layer of, for example gold or sputtered NiFe is provided in advance. A non-magnetic intermediate layer 11 is formed on the first magnetically permeable layer 9 by means of deposition of a non-magnetic material such as $SiO_2$ or $Al_2O_3$. Subsequently, a treatment is carried out in which material is removed from the layers 11 and 9 until the layer 3a is reached, while also some material of layer 3a is removed, resulting in a plane surface 13. Said treatment preferably comprises mechanochemical polishing in order to form a surface which is as plane and smooth as possible. Such a polishing method is described in, for example EP-A 0 617 409 or EP-A 0 617 410. The surface 13 substantially extends through parts of the layers 3a and 11, while the first magnetically permeable layer 9 terminates in the surface 13. In this embodiment, the first layer 9 proximate to the surface 13 has a thickness t of 2 μm.

A non-magnetic gap layer 15 is formed on the surface 13 by depositing a non-magnetic material such as $SiO_2$ or $Al_2O_3$. Subsequently, a second magnetically permeable layer 17 is formed on the gap layer 15 by depositing a magnetically permeable material, for example the same material as used for forming the first layer 9 and subsequent structuring. When the method described above is being performed, resulting in a thin-film magnetic head, a transducing element, for example an inductive element, is formed which magnetically co-operates during use of the magnetic head with the first and second magnetically permeable layers 9 and 17 functioning as flux guides.

The magnetic head obtained is particularly suitable for writing and/or reading narrow information tracks. The magnetic head has a head face 19 along which a recording medium is movable in a first direction x, denoted by the arrow A, with respect to the magnetic head. The gap width w of the magnetic head is determined by the thickness t of the first magnetically permeable layer 9 and extends in a second direction y transverse to the first direction. The head face 19 is thus located in the x-y plane. The magnetic head has a gap length g extending in the first direction x. For the sake of completeness, it is to be noted that the hollow part 7, shown in FIG. 1, has a depth dimension d, viewed in the direction x, proximate to the head face 19.

Figure 5:
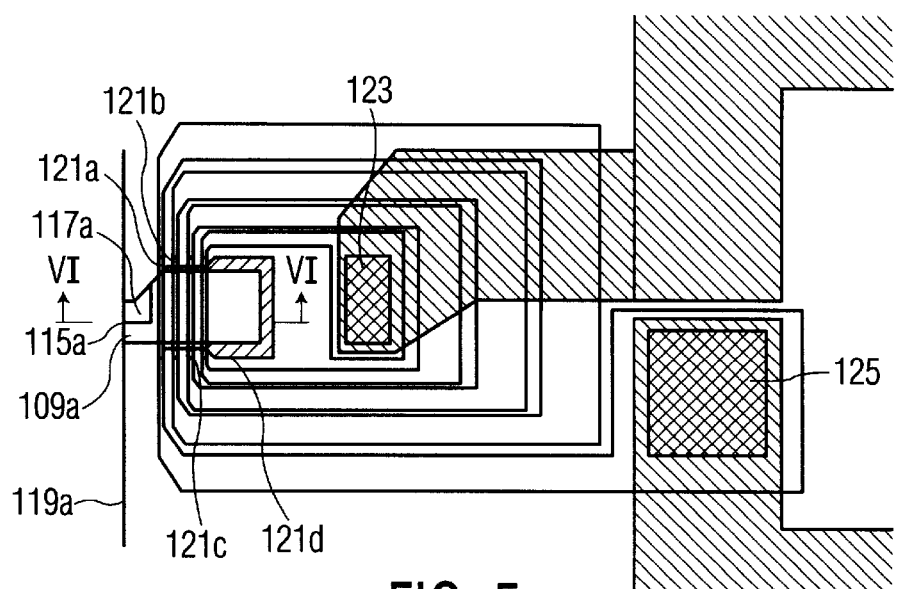
FIG. 5 is a transparent plan view of a first embodiment of the magnetic head according to the invention, obtained by means of the method according to the invention.
Figure 6:
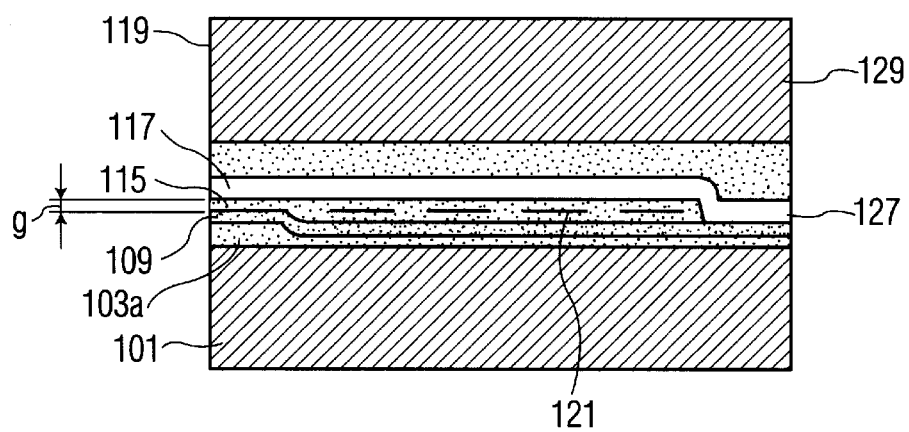
FIG. 6 is a section taken on the line VI—VI in FIG. 5 of said embodiment of the magnetic head.

The magnetic head shown in FIGS. 5 and 6 and obtained by means of the method according to the invention has a head face 119 and comprises a transducing element 121, a first flux guide 109a constituted by a first magnetically permeable layer 109, a second flux guide 117a constituted by a second magnetically permeable layer 117, and a transducing gap 115a which is bounded by the two flux guides 109a and 117a and is constituted by a non-magnetic gap layer 115 which extends between the two magnetically permeable layers 109 and 117. The thickness of the gap layer 115, measured proximate to the head face 119, determines the gap length g.

The magnetic head shown in FIGS. 5 and 6 is manufactured in a similar manner as described with reference to FIGS. 1 to 4, in which the first magnetically permeable layer 109, the gap layer 115 and the second magnetically permeable layer 117 correspond to the first layer 9, the gap layer 15 and the second layer 17, respectively. The first magnetically permeable layer 109 is provided on a hollowed non-magnetic basic layer 103a which is provided on a substrate 101. Prior to providing the second magnetically permeable layer 117, the transducing element 121 is formed in the gap layer 115. This transducing element 121 is an inductive element which, in this embodiment, comprises four windings 121a–d and has two connection faces 123 and 125. The inductive element 121 is situated within a magnetic yoke constituted by the layers 109 and 117 which, at the area 127, are magnetically through-connected proximate to the side of the transducing element 121 remote from the transducing gap 115. To protect the multilayer structure, the magnetic head is provided with a protective block 129.

Figure 7:
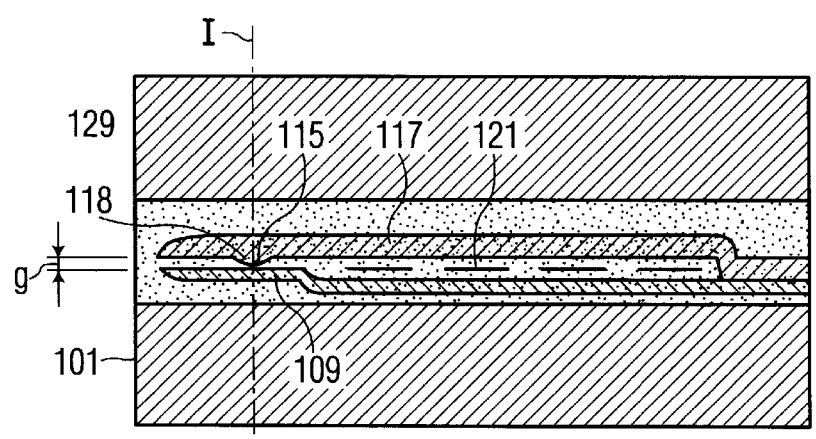
FIG. 7 is a section corresponding to the section taken on the line VI—VI of a semi-manufactured specimen of a second embodiment of the magnetic head.

A magnetic head according to the invention can be obtained from the semi-manufactured product shown in FIG. 7 by forming a head face at the line 1 by means of, for example grinding, polishing or the like. The method used for building up the magnetic head corresponds to the previously described method according to the invention. For obtaining a very short gap length g, an extra step, which will be elucidated hereinafter, has been added to the method described hereinbefore.

For the sake of simplicity, identical reference numerals as in FIG. 6 have been used in FIG. 7, in so far as the same layers are concerned. Said extra step comprises the removal of a part of the gap layer by means of, for example etching in a limited area 1 18 proximate to the line 1, hence at the area of the transducing gap to be formed, whereafter the second flux guide is formed in two phases comprising the deposition of magnetically permeaole material in said part and the subsequent deposition of magnetically permeable material on a large area.

Figure 8:
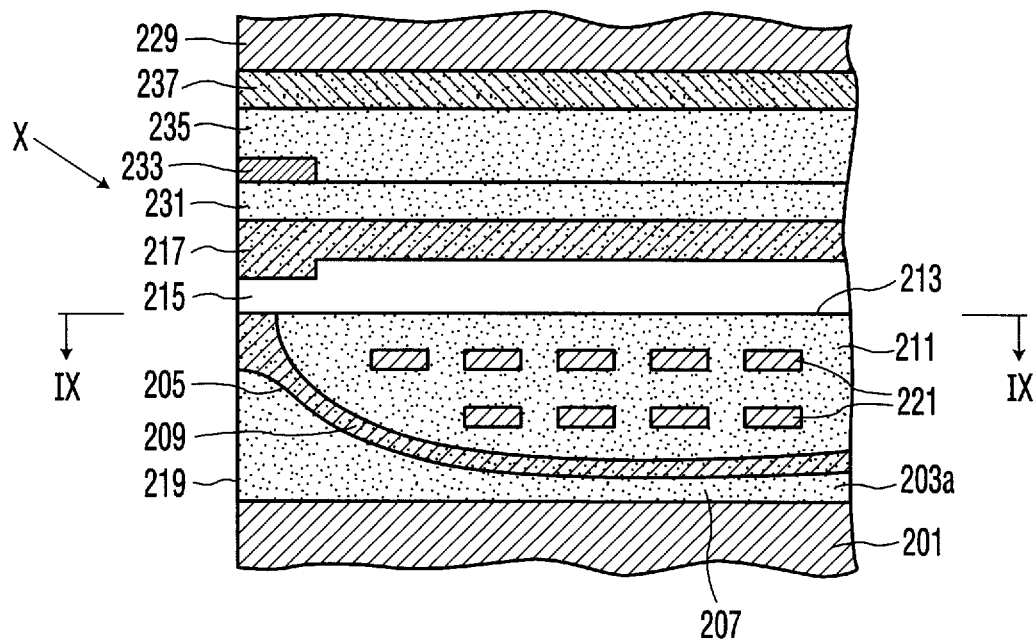
FIG. 8 is a diagrammatic cross-section of a write/read head obtained by using the method according to the invention.
Figure 9:
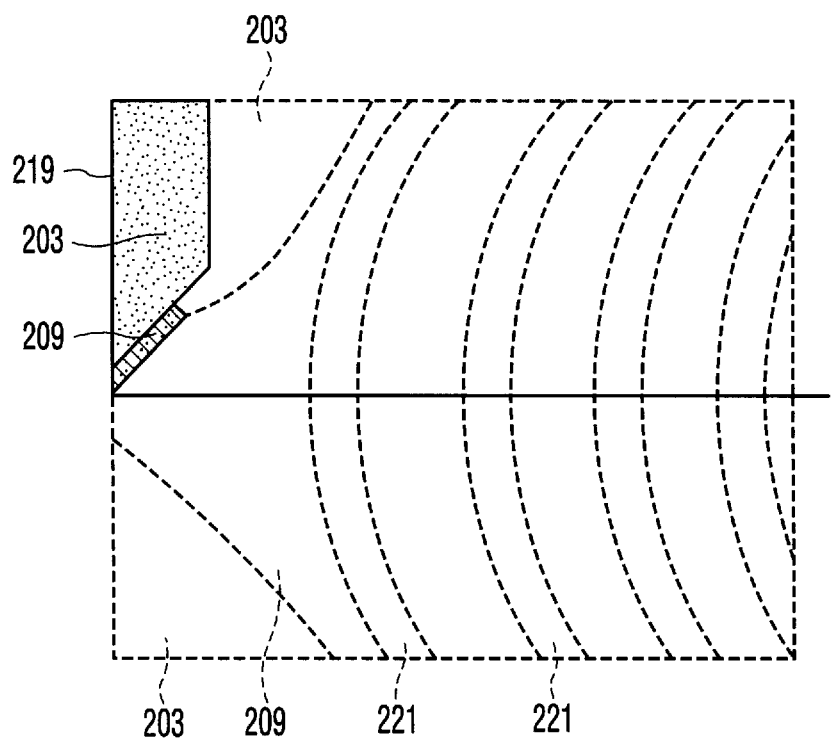
FIG. 9 is a diagrammatic cross-section taken on the line IX—IX in FIG. 8 of the write/read head.
Figure 10:
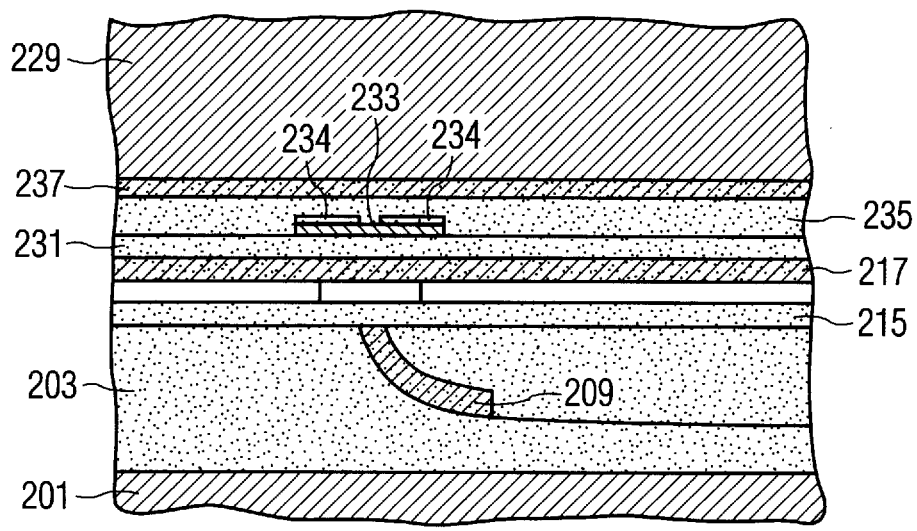
FIG. 10 is a diagrammatic elevational view taken on the line X in FIG. 8 of the write/read head.

The magnetic head shown in FIGS. 8, 9 and 10 is the result of a manufacturing process in which an embodiment of the method according to the invention has been used. This embodiment started from a substrate 201 on which a non-magnetic basic layer 203 was formed by material deposition. This basic layer 203 was subsequently structured, creating a hollow part 207 bounded by a wall portion 205 and a bottom portion 207. Magnetically permeable material was deposited on the structured basic layer 203a, whereafter the layer obtained was structured to form a first magnetically permeable layer 209. Subsequently, a non-magnetic material was deposited, windings 221 of an inductive transducing element were formed and a non-magnetic material was deposited again. The windings 221 and the deposited non-magnetic material jointly constitute a non-magnetic intermediate layer 211. During the method, a planarization process took place to form a plane surface 213 comprising a part of the basic layer 203, a part of the first magnetically permeable layer 209, particularly constituted by the layer thickness, and a part of the intermediate layer 211. A non-magnetic material was deposited on the surface 213, whereafter, for the purpose of forming a gap layer 215, the layer obtained was structured proximate to a head face 219 to be formed. Subsequently, a magnetically permeable material was deposited on the gap layer 215 for forming a second magnetically permeable layer 217 which, due to the structuring of the gap layer, was implemented in this embodiment as a layer which was thicker, preferably in a double-layer structure, at the head face than at areas remote therefrom. A non-magnetic insulation layer 231, a magnetoresistive element 233 with contact layers 234, and a non-magnetic insulation layer 235 were consecutively formed on the magnetically permeable layer 217, whereafter a third magnetically permeable layer 237 was formed on the insulation layer 235 by means of material deposition. After a counter block 229 had been provided for protection of the structure obtained, the head face 219 was formed by mechanical treatment, for example grinding and polishing. For completeness' sake it is to be noted that the materials and deposition methods used in this embodiment may correspond to those mentioned in the previous embodiments.

The magnetic head obtained is a combined read/write head, in which the inductive transducing element may be used for storing signals on a recording medium and the magnetoresistive element may be used for reading information from a recording medium.

Figure 11:
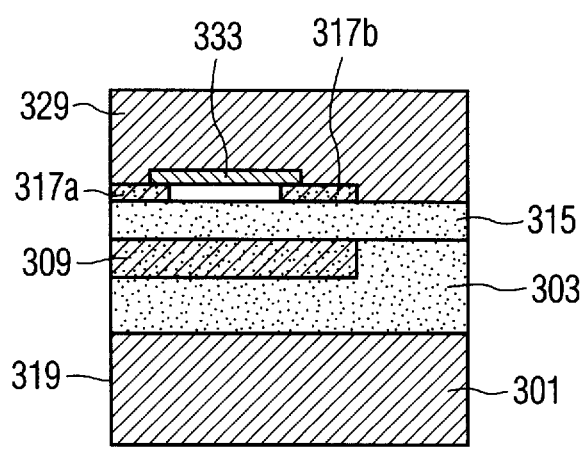
FIG. 11 is a diagrammatic elevational view of the head face of a magnetoresistive head obtained by means of the method according to the invention.

The magnetoresistive head shown diagrammatically in FIG. 11 is also the result of an embodiment of the method according to the invention. This embodiment started from a non-magnetic substrate 301 on which a non-magnetic basic layer 303 was formed. After structuring of the basic layer 303, at which a hollow part was formed which intersects a head face 319 to be formed, a magnetically permeable material was deposited on the structured basic layer and subsequently structured, resulting in a first magnetically permeable layer 309 on which a non-magnetic intermediate layer was subsequently formed by means of material deposition. The intermediate layer is not visible in FIG. 11 because it is above the plane of the drawing. After planarization of the structure formed, a gap layer 315 was formed by means of material deposition, on which layer a second magnetically permeable layer comprising two spatially separated layer portions 317a and 317b was formed by deposition of a magnetic material. Subsequently, a magnetoresistive element 333 was formed, a protective block 329 was provided and the head face 319 was formed.

It is to be noted that embodiments other than those shown are alternatively possible within the scope of the invention. For example, the method may also be used for manufacturing multichannel heads.

I claim:

1. A method of manufacturing a magnetic head having a head face, and comprising a first flux guide, a second flux guide and a transducing gap bounded by the two flux guides, the magnetic head being built up consecutively from a first magnetically permeable layer for forming the first flux guide, a non-magnetic gap layer for forming the transducing gap and a second magnetically permeable layer for forming the second flux guide, said method comprising the steps of:

a. providing a non-magnetic base layer,
 b. forming a hollow part in the base layer, which hollow part has a bottom portion, and a wall portion and a depth dimension d,
 c. providing the first magnetically permeable layer on the base layer thus formed, the first magnetically permeable layer having a thickness which is smaller than the depth dimension d of the hollow part,
 d. providing a non-magnetic intermediate layer on the first magnetically permeable layer,
 e. removing portions of at least the first magnetic layer and the intermediate layer to form a plane surface comprising a part of the base layer, a part of the first magnetically permeable layer and a part of the intermediate layer,
 f. providing the non-magnetic gap layer on said plane surface,
 g. providing the second magnetically permeable layer on said gap layer overlying the part of the first magnetically permeable layer in the plane surface, and h. forming the head face in a direction transverse to the plane surface.

2. A method as claimed in claim 1, wherein the hollow part is formed by etching the non-magnetic base layer.

3. A method as claimed in claim 1, wherein the hollow part is formed in such a way that the wall portion merges with the bottom portion.

4. A method as claimed in claim 1, wherein the first magnetically permeable layer is formed by sputtering, at a sputter angle of between 20° and 70° with respect to the wall portion.

5. A method as claimed in claim 1, wherein the plane surface is formed by mechanochemical polishing.

6. A method as claimed in claim 1, wherein a transducing element is formed after providing the gap layer but before providing the second magnetically permeable layer.

7. A method as claimed in claim 1, wherein a transducing element is formed after providing the first magnetically permeable layer but before providing the gap layer.

8. A method as claimed in claim 6, wherein an insulation layer is provided after the transducing element has been formed, whereafter a part of said insulation layer is removed at the area the transducing gap is to be formed, whereafter the second flux guide is formed.

* * * * *